United States Patent [19]

Ross

[11] 4,209,486
[45] Jun. 24, 1980

[54] PROCESS OF INLAYING A DESIGN IN MOLDED SIMULATED MARBLE

[76] Inventor: Wallace D. Ross, 9719 Echo La., Overland, Mo. 63114

[21] Appl. No.: 9,540

[22] Filed: Feb. 5, 1979

[51] Int. Cl.² ............................ B29C 5/00; B29C 9/00; B29D 3/02
[52] U.S. Cl. ......................... 264/245; 264/73; 264/132; 264/134; 264/135; 264/137; 264/255; 264/257; 264/271; 264/338
[58] Field of Search ............... 264/245, 275, 277, 278, 264/255, 250, 246, 247, 137, 132, 134, 135, 271, 73, 74, 130, 257, 338

[56] References Cited

U.S. PATENT DOCUMENTS

| 125,122 | 4/1872 | Davey | 264/257 |
|---|---|---|---|
| 2,622,991 | 12/1952 | Sturm | 264/246 |
| 2,797,180 | 6/1957 | Baldanza | 264/257 |
| 2,817,619 | 12/1957 | Bickel et al. | 264/245 |
| 3,230,284 | 1/1966 | Iverson et al. | 264/73 |
| 3,312,197 | 4/1967 | Smith | 264/271 |
| 3,518,146 | 6/1970 | Plympton | 264/247 |
| 3,518,341 | 6/1970 | Haru | 264/255 |
| 3,717,899 | 2/1973 | Gardner et al. | 156/579 |
| 3,773,886 | 11/1973 | Starr et al. | 264/255 |
| 3,957,943 | 5/1976 | Ogura | 264/246 |

FOREIGN PATENT DOCUMENTS 50-22061  7/1975  Japan ..................... 264/246

Primary Examiner—Donald E. Czaja
Attorney, Agent, or Firm—Senniger, Powers, Leavitt and Roedel

[57] ABSTRACT

A process of inlaying a design in molded simulated marble or the like comprising the steps of applying a release coating to the inner bottom surface of a mold, applying a transparent gel coat on said release coating, smoothing a piece of porous flexible sheet material bearing the design on one face thereof on the gel coat in the mold to conform to the surface of the gel coat with the one face of the piece of cloth bearing the design toward the gel coat, and casting a hardenable marble mix in the mold over the piece of cloth. The marble mix is then allowed to harden for removal of the resultant simulated marble slab from the mold, the piece of sheet material being embedded in the slab with the design viewable through the transparent gel coat.

17 Claims, 10 Drawing Figures

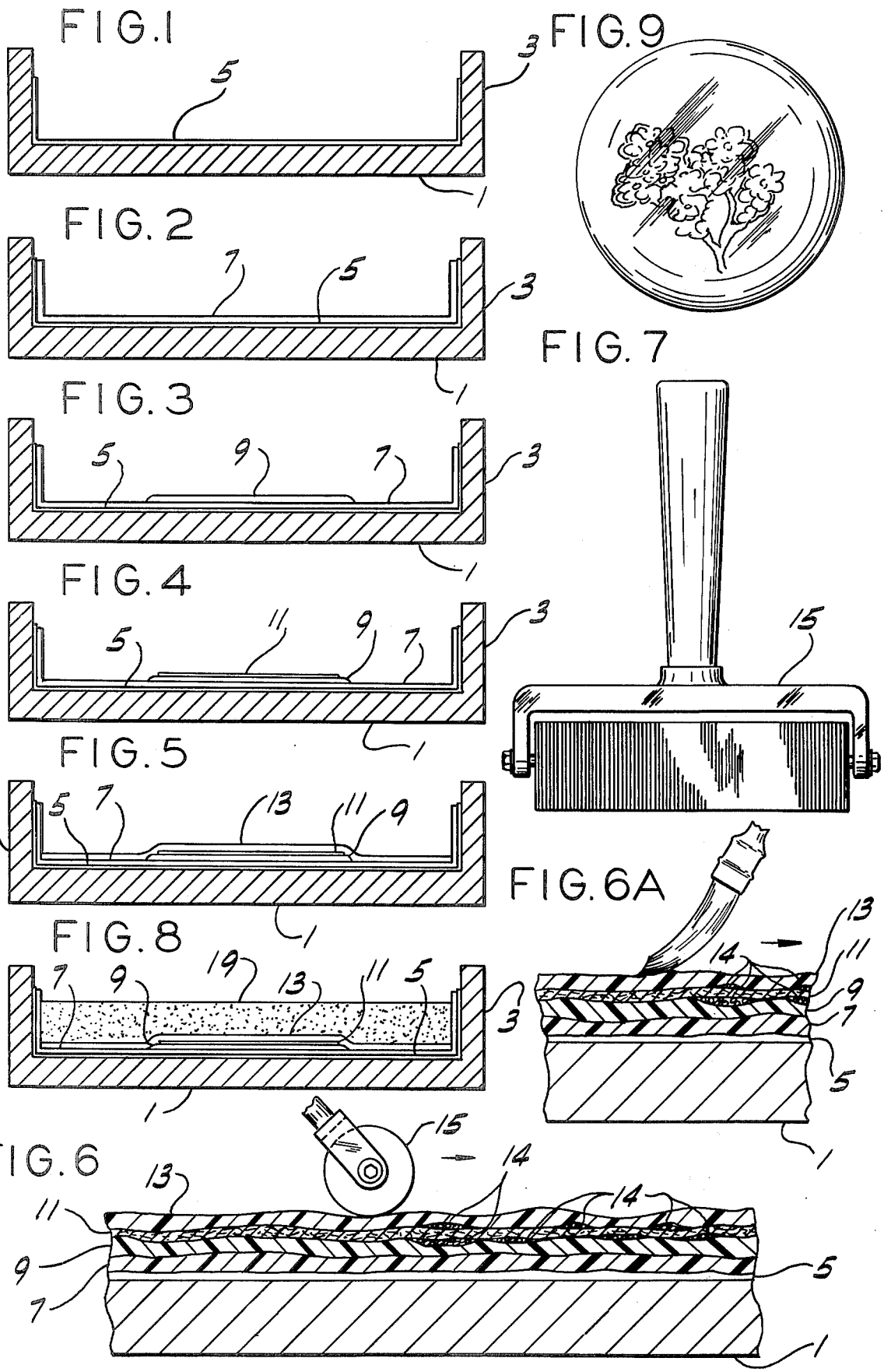

PROCESS OF INLAYING A DESIGN IN MOLDED SIMULATED MARBLE

BACKGROUND OF THE INVENTION

This invention relates to an improved process for inlaying a design in molded simulated marble, hereinafter called, "synthetic marble", or marble.

In general, "cultured" marble, commonly used for sinks, vanity tops, etc., is molded in a mold, which may be in the form of a shallow tray or pan, by applying a transparent release coating (of wax, for example) to the inside of the tray, applying a gel coating on the release coating, allowing the gel coat to gel, and pouring a marble mix in the mold on the gel coat. What is herein called "marble mix" generally comprises a synthetic resin material, catalyst, filler and pigment, the latter being blended into the marble mix to give the finished "marble" the desired color pattern. After the marble mix has hardened into "cultured" marble, the slab with the transparent gel coat thereon is removed from the mold.

Inlaying designs in cultured marble does not appear to have been practiced in modern times, although there is some disclosure in U.S. Pat. No. 125,122, issued Apr. 2, 1872, of embedding ornamental objects in artificial marble. The process disclosed in that patent involves laying an object of metal, wood, glass or other rigid material on a mold surface, filling the mold with a marble mix, allowing the mix to harden, and then removing the resultant marble slab with the object embedded therein from the mold. However, the marble slab was in an unfinished state and required considerable finishing to give it the desired surface characteristics. Thus, the patentee discloses that "when the marbles or embedded designs are removed from the molds or surfaces on which they are formed, they are rubbed down and stopped with cement. Where any holes may occur they may then be stoned and allowed to dry, after which they are ready for polishing or enameling by the usual processes . . ." This process clearly was quite time-consuming and required a great deal of handwork.

Reference may be made to U.S. Pat. No. 3,312,197 relating to embedding coins in clear plastic slabs.

SUMMARY OF THE INVENTION

Among the several objects of this invention may be noted the provision of an improved process for inlaying a design in molded synthetic marble or the like; the provision of such a process wherein the marble has a relatively high-quality finish on removal from the mold; the provision of such a process wherein the design inlaid in the marble is clearly and distinctly viewable in the marble; and the provision of such a process which may readily and economically be carried out.

In general, a process of this invention comprises the steps of applying a release coating to the inner bottom surface of a mold, applying a transparent gel coat on the release coating, smoothing a piece of porous flexible sheet material bearing the aforesaid design on said one face thereof on the gel coat in the mold to conform to the surface of the gel coat, with the face of the piece of sheet material bearing the design toward the gel coat, casting a hardenable marble mix in the mold over the piece of sheet material, and allowing the mix to harden for removal of the resultant synthetic marble slab from the mold, the piece of sheet material being embedded in the slab with the design viewable through the transparent gel coat.

Other objects and features will be in part apparent and in part pointed out hereinafter.

BRIEF DESCRIPTION OF THE DRAWINGS

FIGS. 1-6 schematically illustrate successive steps of a process of this invention of inlaying a design in molded synthetic ("cultured") marble;

FIG. 6A schematically illustrates an alternative way of peforming a particular step of the process;

FIG. 7 is a front elevation of a roller for use in performing the step shown in FIG. 6;

FIG. 8 schematically illustrates another step of a process of this invention; and FIG. 9 is a plan of a synthetic marble slab having a design inlaid therein in accordance with a process of this invention.

Corresponding reference characters indicate corresponding parts throughout the several views of the drawings.

DESCRIPTION OF THE PREFERRED EMBODIMENTS

Referring now to the drawings which illustrate an improved process of this invention for inlaying a design in molded synthetic ("cultured") marble or the like, a mold for molding such marble is designated by the reference numeral 1 and is shown to have a rim 3 extending upwardly at its periphery. This mold is preferably a fiberglass mold, although other mold materials (e.g., stainless steel, glass) are also suitable.

In accordance with this invention, a release coating 5 is applied to the inner bottom and side surfaces of the mold 1 to insure clean separation of the marble from the mold (FIG. 1). While numerous different release agents may be used for this purpose, a Carnauba-based hard wax, such as that marketed by Ceara Products Inc., under the trademark CEARA, is an example of one mold release agent which has been found to give particularly good results. Other waxes, such as that sold under the trade designation of "Meguiar's Mirror Glaze" may also be used. After the release coating 5 has been applied, a transparent gel coat 7 is sprayed or brushed on the release coating to a uniform thickness of 0.010-0.020 inches (0.015 inches being an optimum thickness) and allowed to gel (FIG. 2). This gel coat may be, for example, a polyester resin gel coat such as sold by American Cyanamid Co., Plastics Division, of Wallingford, Conn. under the trademark LAMINAC and designated EPX 117-8. This particular gel coat has a gel time of 8-12 minutes at 80° F. when catalyzed with a 1% solution of methyl ethyl ketone (MEK) peroxide catalyst. Another suitable synthetic resin gel coat material is sold by Ram Chemicals of Gardena, Calif. under the trade designation RAM 66.

After the first gel coat 7 has gelled, i.e., the resin solids partially polymerize to a substantially nontacky state in which no resin adheres to the fingers when drawn over the gel coat, it should be allowed to cure (further polymerize) for an additional 20-30 minutes prior to the application of a second coat 9 over the first coat. This is to prevent wrinkling or "alligatoring" of the first gel coat when the second coat is applied. After the first gel coat has cured, a second gel coat 9, which is preferably of the same composition and thickness (0.010-0.020 inches) as the first coat, is then applied, as by brushing, over the first coat (FIG. 3), and a piece of porous flexible sheet material 11, such as cloth, bearing a design (e.g., a floral design) on one face thereof is immediately placed on the second gel coat 9 (FIG. 4) with the face bearing the design facing down toward the mold. Although only one relatively large piece of cloth is illustrated in the drawings, it will be understood that several smaller, separate pieces of cloth could also be used. In that case, it would be necessary to apply the second gel coat 9 only to those discrete areas on which the pieces of cloth were to be placed. In any event, the second gel coat 9 should be applied to the extent that the entire bottom face (i.e., the face bearing the design) of each piece of cloth placed in the mold is in contact with the coat 9. With the piece of cloth 11 in the mold and prior to the gellation of the second gel coat 9, another coating 13 of gel is applied (e.g., brushed) on the upper face of the cloth and on the side edges of the cloth so that the entire piece of cloth is completely encapsulated by gel (FIG. 5). The thickness of the gel coating 13 on top of the piece of cloth 11 should also be in the range of approximately 0.010–0.020 inches. It will be understood that instead of brushing, for example, the second gel coat 9 on the first gel coat 7, placing the piece of cloth in the mold on the second gel coat and then applying coating 13 to the upper face of the piece of cloth, gel could be directly applied, as by brushing, to both faces of the piece of cloth on the outside of the mold and the piece of cloth then placed in the mold (after the gel coat 7 has gelled, as described above) with the face bearing the design facing down.

After the coating 13 has been applied to the upper face of the piece of cloth 11, but before that coating 13 and the second gel coating 9 beneath the piece of cloth have gelled, the cloth is smoothed to conform to the surface of the hardened first gel coat 7. This removes any air, such as is indicated at 14 in FIGS. 6 and 6A, trapped between the bottom face of the cloth bearing the design and the first and second gel coats 7, 9 thereby to insure clarity of the design as viewed through the gel coats 7, 9 when the marble slab is removed from the mold. Any air trapped between the piece of cloth and the upper gel coating 13 is also removed. To obtain the best results in clarity of design, the cloth used should be of stretchable material so as to enable it readily to conform to the surface of the first gel coat 7 which may be irregular. Moreover, the cloth should be porous for allowing air trapped beneath it to escape through it. Polyester knit cloth and fiberglass cloth satisfy both of these criteria and have been found to be especially suitable.

As illustrated in FIGS. 6 and 7, smoothing of the piece of cloth 11 on the first gel coat 7 is accomplished, for example, by rolling the cloth with a roller 15. As shown, this roller has a series of circumferential grooves 17 therein spaced axially of the roller, the grooves being spaced close enough together (e.g., 1/32 inch) to force any air out from under the cloth and yet sufficiently far apart so as not to force the gel of the ungelled coat 9 from beneath the cloth. In cases where the inner bottom surface of the mold is curved (e.g., concave), the roller may be of increased diameter toward its middle so as better to conform to the mold surface and ensure that the piece of cloth is properly smoothed out over its entire area. Alternatively, the cloth may be brushed (see FIG. 6A) to remove air from beneath the cloth.

After the piece of cloth has been smoothed, gel coatings 9 and 13 should be allowed to gel and then, as illustrated in FIG. 8, a marble mix 19 is cast in the mold to a level corresponding to the desired thickness of the finished marble slab. The composition of this marble mix will, of course, vary depending on the desired gel time, marble characteristics, etc. A typical low-viscosity, low-exotherm marble mix used in the production of table tops, for example, comprises 100 parts of a polyester resin, such as that marketed by Cargill, Chemical Products Division, of Carpentersville, Ill. under the trade designation Polyester Resin PE-8804, 300–400 parts of limestone filler material, 0.5–1.0 parts MEK peroxide, 5 parts background pigment, and graining pigment as needed for effect. At 77° F. and 0.5 parts MEK peroxide, this mix would have a gel time of about 15.5 minutes, and at 90° F. and 1.0 parts MEK peroxide, the mix would have a gel time of about 5 minutes. It is to be understood that any of the many commercially available cultured marble mixes are also useful. As will be well known to those in the art, the mold should be vibrated during polymerization (hardening) of the marble mix to insure a uniform consistency of the mix and to facilitate the escape of entrapped air in the mix.

After the marble mix has polymerized (hardened), the marble slab may be removed from the mold and allowed to fully cure. As shown in FIG. 9, the designs on the piece of cloth 11 are clearly and distinctly viewable through the transparent gel coats 7, 9.

If the piece of porous flexible material used in the method of this invention is sufficiently thin (e.g., about 0.001 in.) the above-described method may be modified. Thus a release coating, such as the wax coating 5 discussed above, is first applied to the inner bottom surface of the mold 3 and a transparent gel coat, such as gel coat 7, is applied on the release coating. Then, prior to gelation of the gel coat, a thin piece of material such as rice paper, for example, bearing a design on one of its faces is placed on the ungelled gel coat with the face bearing the design toward the gel coat. The piece of rice paper, which is preferably about 0.001 inch thick, is then smoothed or pressed (as with a dry brush, for example) on the gel coat, causing gel to seep up through the porous piece of material and to saturate it. After the gel coat has gelled, a hardenable marble mix (e.g., mix 19) is cast in the mold over the rice paper and allowed to harden. The finished marble slab may then be removed from the mold, the design on the piece of rice paper being viewable through the transparent gel coat.

One of the characteristics of rice paper which renders its use particularly suitable in the process of this invention, is that when the rice paper is smoothed on the ungelled gel coat and becomes permeated with gel, it assumes the color of the gel and, in effect, "disappears" or becomes invisible. Thus, only the printed design portions on the rice paper are visible in the finished marble slab, and no matter how intricate the design may be, it is always clear and sharply defined. Moreover, inasmuch as the rice paper is very thin and therefore flexible, it readily conforms to the contours of the mold and release coating.

The use of a very thin, porous piece of material such as rice paper is advantageous for the further reason that, unlike a thicker piece of cloth, it may be placed on the gel coat 7 before the latter has gelled, thus reducing the time necessary to complete the process of this invention. In this respect, the present process may vary, depending on the thickness of porous sheet material used. However, it will be understood that the same steps described above in regard to cloth could be applied to rice paper with good result.

In view of the above, it will be seen that the several objects of the invention are achieved and other advantageous results attained.

As various changes could be made in the above process without departing from the scope of the invention, it is intended that all matter contained in the above description or shown in the accompanying drawings shall be interpreted as illustrative and not in a limiting sense.

What is claimed is:

1. A process of inlaying a design in molded synthetic marble comprising:

applying a release coating to the inner bottom surface of a mold;

applying a transparent gel coat on said release coating;

placing a piece of porous flexible sheet material bearing said design on one face thereof on the gel coat in the mold, with said one face toward the gel coat;

smoothing said piece of sheet material on said gel coat to contour it to the surface of the gel coat and to remove any air trapped beneath it, with any such air escaping up through the porous sheet material;

casting a hardenable marble mix in the mold over the piece of sheet material; and allowing the marble mix to harden for removal of the resultant synthetic marble slab from the mold, said piece of sheet material being inlaid in the slab with the design viewable through said transparent gel coat.

2. A process as set forth in claim 1 wherein said transparent gel coat is approximately 0.010–0.20 inches thick.

3. A process as set forth in claim 1 wherein said piece of flexible sheet material is smoothed on the gel coat in the mold prior to gelation of the latter.

4. A process as set forth in claim 3 further comprising the step of allowing said gel coat to gel prior to casting the marble mix in the mold.

5. A process as set forth in claim 4 wherein said sheet material is a fibrous material.

6. A process as set forth in claim 4 wherein said sheet material is approximately 0.001 in. thick.

7. A process as set forth in claim 1 further comprising the steps of allowing the gel coat in the mold to gel and then coating with a transparent gel said one face of the piece of sheet material, all prior to smoothing the piece of sheet material on said gel coat.

8. A process as set forth in claim 7 further including the step of allowing the gel on said one face of the piece of sheet material to gel before casting the marble mix in the mold.

9. A process as set forth in claim 8 wherein the sheet material is a stretchable cloth.

10. A process as set forth in claim 9 wherein the cloth is a polyester knit cloth.

11. A process as set forth in claim 9 wherein the cloth is a fiberglass cloth.

12. A process as set forth in claim 9 further comprising coating the other face of the piece of cloth with a transparent gel prior to smoothing the piece of cloth on said gel coat in the mold, and allowing the gel on said other face to gel prior to casting said marble mix in the mold.

13. A process as set forth in claim 9 wherein the piece of cloth is smoothed on said gel coat by being rolled on the coat.

14. A process as set forth in claim 9 wherein the piece of cloth is smoothed on said gel coat by brushing.

15. A process as set forth in claim 9 wherein said one face of the piece of cloth is coated with a gel coat approximately 0.010–0.020 inches thick.

16. A process as set forth in claim 9 wherein said transparent gel coat in the mold constitutes a first gel coat and said one face of the piece of cloth is coated by applying a second transparent gel coat over the first gel coat after the latter has gelled, and placing the piece of cloth on the second gel coat before it has gelled with said one face of the piece of cloth toward the second gel coat thereby to coat said one face with gel, the piece of cloth being smoothed on the first and second gel coats prior to gellation of the latter.

17. A process as set forth in claim 16 further comprising applying a gel coat to the other face of the piece of cloth after it has been placed in the mold on said second gel coat but prior to the piece of cloth being smoothed, and allowing the gel coat on said other face to gel prior to casting said marble mix in the mold.

* * * * *